United States Patent
Schmitt et al.

(10) Patent No.: US 6,814,414 B1
(45) Date of Patent: Nov. 9, 2004

(54) DEVICE AND METHOD FOR PREVENTING ROLLBACK OF A VEHICLE ON AN INCLINE

(75) Inventors: Johannes Schmitt, Markgroeningen (DE); Matthäus Koch, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/409,583

(22) Filed: Sep. 30, 1999

(30) Foreign Application Priority Data

Sep. 30, 1998 (DE) .......................................... 198 44 875
Nov. 20, 1998 (DE) .......................................... 198 53 701

(51) Int. Cl.$^7$ ............................................... B60T 8/32
(52) U.S. Cl. ...................... 303/191; 303/9.62; 303/186; 188/DIG. 2
(58) Field of Search ................................ 303/191, 192, 303/198, 186, 9.62, 9.69, 9.67, 9.68, 9.71, 9.63, 21.1, 113.5; 188/DIG. 2

(56) References Cited

U.S. PATENT DOCUMENTS

| | | | | |
|---|---|---|---|---|
| 5,383,719 A | * | 1/1995 | Farr | 303/113.2 |
| 5,611,606 A | * | 3/1997 | Nell et al. | 303/155 |
| 5,646,841 A | * | 7/1997 | Suzuki et al. | 364/424.098 |
| 5,957,552 A | * | 9/1999 | Claussen et al. | 303/192 |
| 5,979,619 A | * | 11/1999 | Rump | 188/353 |
| 5,984,429 A | * | 11/1999 | Nell et al. | 303/113.4 |
| 6,019,442 A | * | 2/2000 | Zechmann et al. | 303/186 |
| 6,053,584 A | * | 4/2000 | Schunck et al. | 303/167 |
| 6,056,373 A | * | 5/2000 | Zechmann et al. | 303/191 |
| 6,082,835 A | * | 7/2000 | Brealey | 303/169 |

FOREIGN PATENT DOCUMENTS

| | | |
|---|---|---|
| DE | 38 32 025 | 3/1990 |
| DE | 43 32 459 | 3/1995 |
| DE | 19611360 | * 9/1997 |
| DE | 196 25 919 | 1/1998 |
| DE | 196 25 989 | 1/1998 |
| DE | 196 53 230 | 6/1998 |

* cited by examiner

Primary Examiner—Douglas C. Butler
Assistant Examiner—Bradley King
(74) Attorney, Agent, or Firm—Kenyon & Kenyon

(57) ABSTRACT

A device for preventing a rollback of a vehicle on an incline. The vehicle is equipped with a brake system, via which at least the braking pressure in the wheel brakes of a rear wheel is influenced in order to distribute the braking action between at least one front wheel and one rear wheel by actuating actuators assigned to the rear wheels so that a differential is set between the pressure of the front wheel and the rear wheel (e.g., an EBD braking). The device has a first arrangement for determining whether vehicle standstill is occurring due to braking where a differential in the braking pressure of the front wheel and the rear wheel has been set. The device also includes a second arrangement for determining whether the vehicle is rolling back from a standstill. If the second arrangement detects a vehicle rollback, the braking pressure in at least one rear wheel is increased to inhibit rollback.

3 Claims, 3 Drawing Sheets

DEVICE AND METHOD FOR PREVENTING ROLLBACK OF A VEHICLE ON AN INCLINE

FIELD OF THE INVENTION

The present invention relates to a device and method for preventing rollback of a vehicle on an incline. In order to prevent a vehicle from rolling back, the braking pressure is increased on at least the rear wheels, independently from the driver, if certain conditions are met.

BACKGROUND INFORMATION

Methods and devices for influencing the braking pressure in order to prevent vehicle movement that is not intended by the driver are known from the conventional methods and devices.

For example, a vehicle with automatic transmission can be held at a standstill by the driver, as known, using the brakes, since with the transmission engaged, the vehicle tends to move slowly forward ("creeping") due to the converter. The required driver effort can be reduced if the required braking pressure is held constant once it is applied. This can be accomplished, for example, by "locking" the braking pressure initiated by the driver on the wheel by a valve located between the main brake cylinder and the wheel brake cylinder as long as the vehicle is stopped. A vehicle speed sensor detects the standstill state for this purpose. The driver can then remove his foot from the brake pedal, while the wheels remain blocked by the brake. The braking pressure in the wheels is reduced as soon as the driver actuates the accelerator and thus signals his intent to start the vehicle moving. Such conventional system for creep inhibition is described in, for example, German Patent Other "hill holder" systems are also known. These conventional systems concern the following situation: Driving off a vehicle having a manual transmission system is a complex procedure requiring the combined use of accelerator and clutch pedals in conjunction with actuating the hand brake. It is difficult to apply the correct amount of braking action, i.e., braking torque when the vehicle starts moving so that the vehicle does not roll in the wrong direction until the driving torque transmitted by the transmission is sufficient for actual motion start. There are many proposals on how to facilitate the driver's task in this situation. In vehicles with hydraulic brake systems, for example, the wheel braking pressure can be isolated from the main brake cylinder by using a control valve. The pressure, once applied by the driver, remains even if the driver is no longer actuating the brake. This procedure is activated using a special switch. The driver can now initiate the procedure of moving the vehicle without concerning himself with the brakes. The control valve is opened as soon as vehicle motion is detected via a change in the rotary position of the drive shaft. German Patent Application No. 38 32 025 describes such a conventional hill holder starting aid.

German Patent Application No. 196 25 919 describes a system for controlling the braking action in a motor vehicle having means for setting the braking action independently of the driver's action. Upon detecting a predefinable operating mode, in which at least the longitudinal velocity of the vehicle 0 is determined, a certain braking action is applied. Such an operating mode may be present, for example, when the driver wishes to have the aforementioned creep inhibition or the aforementioned starting aid. For this purpose, when a predefinable longitudinal vehicle speed is detected during this operating mode, the braking action is increased independently of the driver. By observing the longitudinal vehicle speed, a forward motion of the vehicle that is not desired by the driver is reliably inhibited during the operating mode (creep inhibition mode or hill holder mode). This conventional system is based on the fact that all wheel brake cylinders have the same braking pressure at the beginning of the driver-independent braking action. The situation where the braking pressure in the front and rear wheels is different is not considered.

Furthermore, methods and devices for controlling the brake system of a vehicle are known where at least the braking pressure in the wheel brakes of one rear wheel is influenced in order to distribute the braking action between at least one front wheel and one rear wheel. This influencing scheme is accomplished by setting a differential between the braking pressures of the front wheel and the rear wheel. German Patent Application No. 196 53 230 provides that the differential set between the braking pressure of the front wheel and the rear wheel is reduced when a predefinable situation is present. The predefinable situation is present when a measured quantity, representing the longitudinal vehicle speed, drops below a predefinable threshold value. As the longitudinal vehicle speed diminishes, the differential set between the braking pressure of the front wheel and the rear wheel is continuously reduced.

An object of the present invention is to improve existing devices and methods for vehicles equipped with a braking system with which, in order to distribute the braking action between at least one front wheel and one rear wheel, at least the braking pressure on the wheel brakes of a rear wheel is influenced, so that when braking action is performed on an incline, in which a suitable differential is set between the braking pressure of the front wheel and the rear wheel, the vehicle is prevented from rolling back.

SUMMARY OF THE INVENTION

The device according to the present invention prevents a vehicle from rolling back on an incline. In vehicles having a heavy rear load (caused, for example, by the vehicle cargo), which are equipped with a brake system with which, in order to distribute the braking action between at least one front wheel and one rear wheel by actuating actuators assigned to the rear wheel so that a differential is set between the brake pressure in the front wheel and the rear wheel, it may occur in the case of such braking (hereinafter referred to as EBD—electronic braking force distribution) on steep inclines that the braking pressure in the rear axle is insufficient for holding the vehicle on the incline after braking to a complete stop. The vehicle with a heavy rear load may then slip downward on the incline with blocked front wheels. The front axle, bearing little load, can barely transmit any braking force.

EBD braking is defined as follows: a differential is set between the braking pressure on the front wheels and the rear wheels and thus the braking action is distributed at least by actuating actuators assigned to the rear wheels of the vehicle. This distribution of the braking pressure and thus of the braking action ensures that the rear axle is not locked before the front axle. In EBD distribution the braking action is "locked" in the rear wheels by appropriately activating the actuators assigned to the rear wheels, i.e., the pressure remains unchanged during EBD braking and cannot be increased by the driver. On the other hand, the braking pressure of the front wheels can be increased by the driver at any time. This can be disadvantageous under certain circumstances in the case of braking a vehicle having a heavy load on an incline, namely when the braking pressure on the rear wheels is insufficient, as described above, to hold the vehicle at standstill on the incline.

The device according to the present invention has a first arrangement which determines whether the vehicle is at a standstill due to braking, in which an appropriate differential is set between the front wheel and the rear wheel, i.e., in EBD braking. Furthermore, the device according to the present invention has a second arrangement which determines whether the vehicle is rolling back from standstill. If the second arrangement detects a rollback of the vehicle, the braking pressure is increased on one rear wheel of the vehicle in order to inhibit rollback.

As long as no vehicle rollback is detected, the braking pressure that has been set is advantageously maintained at least for the rear wheels. On the other hand, the braking pressure on the front wheels can be increased by the driver.

In order to inhibit vehicle rollback, the braking pressure is advantageously increased only on the rear wheels. The braking pressure is only increased in the rear wheels because a greater braking effect can be achieved with the rear wheels in the event of rollback on an incline due to the load distribution.

Particular embodiments may be advantageous for implementing the standstill detection performed by the first arrangement and the rollback detection performed by the second arrangement.

The first embodiment is based on the evaluation of a velocity quantity, which describes the velocity of the vehicle, and the analysis of wheel speed quantities, which describe the wheel speeds of the individual wheels. Both detections according to the first embodiments operate reliably. However, due to the fact that the wheel speeds and thus also the vehicle velocity cannot be evaluated below a low characteristic velocity (the wheel speed signals generated by the rotation speed sensors are not sufficiently accurate), the vehicle, when rolling back, reaches at least this low characteristic velocity before the velocity quantity and the wheel speed quantities can be evaluated and thus before the braking pressure buildup according to the present invention can be implemented on the rear axle. Concerning this problem, the analysis, on which the second embodiment is based, of detected quantities, which show whether the alternation, characterizing the wheel speed signals, between a first and a second signal value due to the rotation characteristics of the wheel is present, represents an improvement. This alternation between the first and second signal value is present even at the lowest rotation speeds of the wheels, i.e., below the low characteristic speed. Consequently, by evaluating the detected quantities when rollback is detected, the rear axle wheel pressure buildup according to the present invention can be performed even at vehicle velocities below the low characteristic velocity.

These embodiments are based on the fact that the wheel (rotational) speed signals are signals that have been prepared in signal form. These are square signals alternating between a first and a second value.

The common feature of both embodiments is that a sensor arrangement, in particular speed sensors, is assigned to the wheels and generate wheel speed signals describing the rotation of the respective wheels. The device according to the present invention also contains an arrangement for both embodiments that determine, based on the wheel speed signals, a speed value describing the velocity of the vehicle.

According to the first embodiment, the device contains an arrangement that, based on the wheel speed signals, determines wheel (rotational) speed quantities describing the wheel speeds of the individual wheels. The wheel speed quantities are evaluated in the second arrangement to detect vehicle rollback.

According to the first embodiment, vehicle standstill is preferably defined as occurring when the velocity quantity is equal to or less than a first predefinable comparison value. Vehicle rollback is preferably defined as occurring when the wheel speed quantities of the front wheel are equal to or less than a second predefinable comparison value and the wheel speed quantity of at least one rear wheel is greater than the second predefinable comparison value.

As described above, the wheel speed signals alternate between a first and a second signal value depending on the rotation of the wheel. This alternation is evaluated in a second embodiment for standstill detection and rollback detection. According to the second embodiment, the device contains an arrangement with which the detection quantities for the individual wheels can be determined as a function of the wheel speed signals, the detection quantities alternating between the first and second signal values. These detection quantities are evaluated in the first arrangement to detect vehicle standstill and/or in the second arrangement to detect vehicle rollback.

In the second embodiment, three advantageous versions are possible for standstill detection. Vehicle standstill is advantageously defined as occurring, e.g., when the velocity quantity is equal to or less than a first predefinable comparison value, and when the detection quantities of the rear wheels indicate that the signal does not alternate between the first and second signal values for either of the rear wheels, or when the velocity quantity is equal to or less than a first predefinable comparison value and when the detection values of the front wheels indicate that the signal does not alternate between the first and second signal values for either of the front wheels, or when the velocity quantity is equal to or less than a first predefinable comparison value and when the detection values of the front wheels indicate that the signal does not alternate between the first and second signal values for either of the front wheels and when at least the detection quantity of one rear wheel indicates that the signal does not alternate between the first and second signal values.

The wording used in the third version "when at least the detection quantity of one rear wheel indicates that the signal does not alternate between the first and second signal values" may indicate that either one detection value shows or both detection values show at the same time that the signal does not alternate. In other words, this wording also includes a version in which vehicle standstill is occurring if, among other things, the detection values of the rear wheels show that the signal does not alternate for either of the rear wheels.

Two advantageous versions are possible for rollback detection in the second embodiment. The vehicle rollback is advantageously defined as occurring, e.g., when the detection quantities of the front wheels indicate that the signal does not alternate between the first and second signal values for either of the front wheels and when at least the detection quantity of one rear wheel indicates that the signal alternates between the first and second signal values, or when the detection quantities of the front wheels indicate that the signal does not alternate between the first and second signal values for either of the front wheels and when the detection quantities of the rear wheels indicate that the signal alternates between the first and second signal value.

The braking pressure on at least one rear wheel is not increased until it is determined that vehicle rollback has been occurring for a predefined period of time. In order to determine whether or not vehicle rollback has been occurring for a predefined period of time, a time quantity, in particular a time count, is compared to a threshold value. To measure the period of time during which rollback has occurred, the time quantity is incremented by one each time vehicle rollback is determined.

Vehicle rollback after EBD braking, which results in vehicle standstill and makes it necessary to build up pressure in the rear axle, is detected more reliably by using the time quantity. Vehicle standstill with subsequent slight rollback of the vehicle is recognized in the standstill and rollback recognition according to the present invention, in particular using the detection values also in the case of a pitching vehicle during a very short standstill phase. Vehicle pitching results in a slight motion of the rear wheels, i.e., the rear axle without noticeable vehicle rollback. This is, however, detected as vehicle rollback in rollback detection, since the wheel signals alternate between a first and a second value. In order to avoid this erroneous detection, the duration of vehicle rollback is determined with the help of the time quantity. It can then be safely assumed that actual vehicle rollback is occurring only after the time quantity has exceeded a predefined time quantity threshold value, which corresponds to a predefined duration, since then it can be safely assumed that actual vehicle rollback is occurring, which causes pressure to be built up in the rear axle according to the present invention.

The advantages resulting from a combination of the evaluations serving as the basis of the two embodiments and from a combination of signals/quantities evaluated in the two embodiments is also possible.

DETAILED DESCRIPTION

Figure 1:
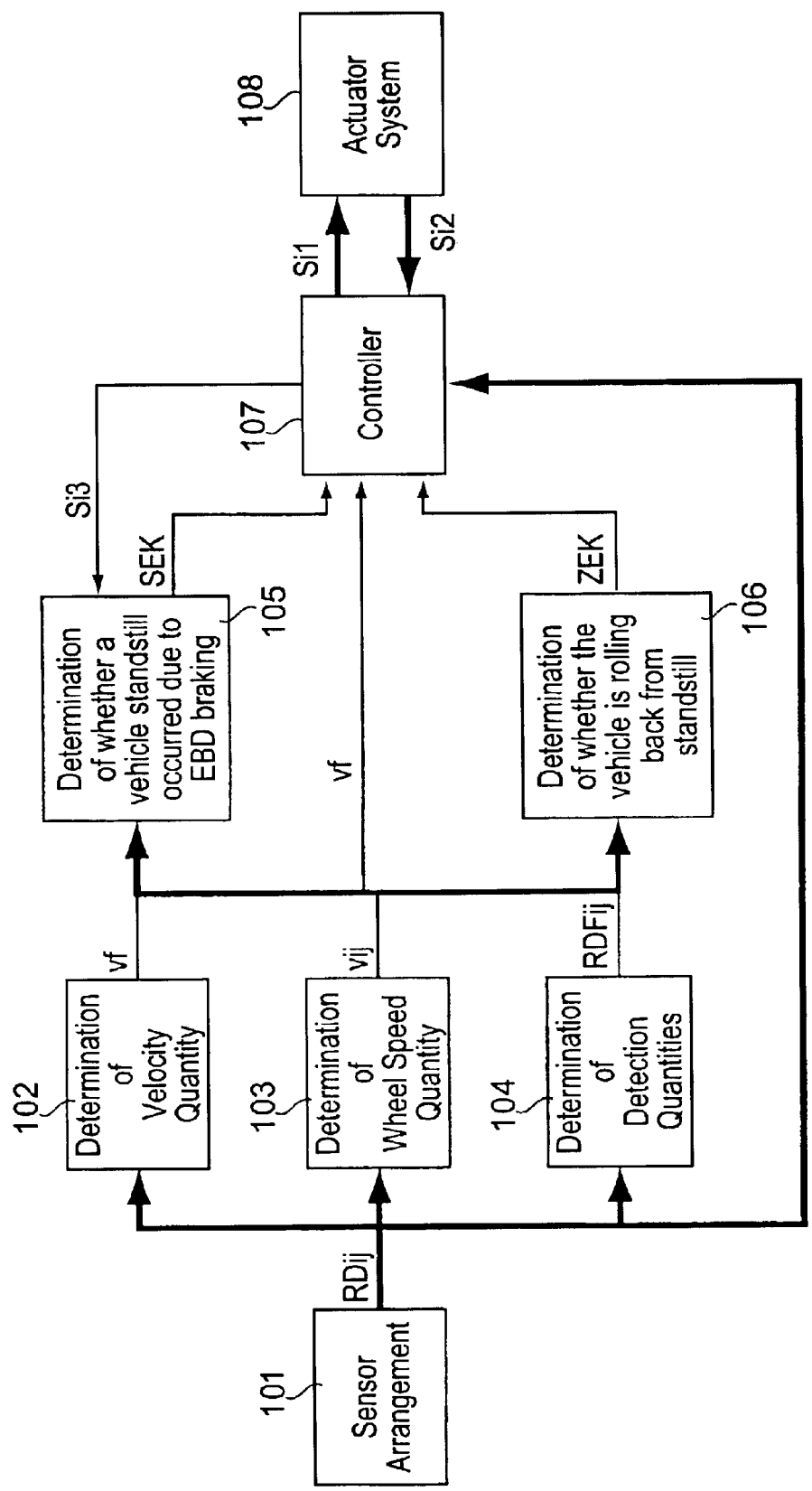
FIG. 1 shows an exemplary embodiment of a device according to the present invention for carrying out a method according to the present invention.

Block 101 represents a sensor arrangement, e.g., at least one rotation speed sensor, which generates wheel rotational speed signals RDij describing the rotation of the respective wheels. The wheel speed signals have a first or second signal value depending on the rotation of the wheel. In each case, wheel speed signals RDij go to a block 102 and a block 107. Depending on the embodiment of the standstill detection and rollback detection, wheel signals RDij go to a block 103 or a block 104. In a first embodiment, in which a velocity quantity vf describing the velocity of the vehicle and wheel speed quantities vij describing the speeds of the individual wheels are used, there is a block 103, but not to block 104. In a second embodiment, in which velocity quantity vf and detection quantities RDFij, indicating alternation between the first and second signal values for the individual wheels, are used in block 104, but not in block 103. An optional illustration based on a usage of the first embodiment or the second embodiment is not shown in FIG. 1. These two embodiments will be described in more detail below and shown in FIGS. 2 and 3.

The simplified notation used with the wheel speed signals RDij is described below: Index i shows whether the wheel speed signal refers to a wheel of the front axle (v) or a rear axle (h) wheel speed signal. Index j shows whether the signal is the wheel speed signal of a right (r) or a left (l) wheel. The meaning of the two indices i and j is the same for all quantities and signals for which they are used.

A velocity quantity vf describing the velocity or the vehicle is determined in a conventional manner as a function of the wheel speed signals RDij in block 102. Velocity quantity vf is sent to both block 105 and block 107, regardless of which of the two embodiments is implemented in blocks 105 and 106.

Wheel speed quantities vij describing the speeds of the individual wheels are determined in a conventional manner as a function of the wheel speed signals RDij in block 103. In this determination, influences of the vehicle motion on the wheel speed signals RDij and different rolling radii of the individual wheels, for example, are taken into account. The wheel speed quantities vij are sent to a block 106 if the first embodiment is implemented in blocks 105 and 106.

In block 104, detection quantities RDFij indicating that the respective wheel speed signal alternates between the first and second signal value is determined as a function of wheel speed signals RDij. If the second embodiment is implemented in blocks 105 and 106, detection quantities RDFij are sent to both block 105 and block 106.

Detection values RDFij are assigned the following values, for example: if the wheel speed alternates, the detection value is assigned a value 1; if the wheel speed does not alternate, the detection value is assigned a value 0.

Block 105 determines whether vehicle standstill is occurring due to EBD braking. If vehicle standstill is occurring, this is communicated to block 107 via quantity SEK. The following values are assigned here: If there is standstill, SEK=1. If there is no standstill, SEK=0. According to a first embodiment, standstill detection is started in block 105 with quantity Si3, which is sent from block 107 to block 105. This will be explained in more detail below with reference to FIG. 2. This quantity Si3 is not needed in the second embodiment, which is described below with reference to FIG. 3.

Block 106 determines whether the vehicle is rolling back from standstill. If there is rollback from a standstill, this is communicated to block 107 via quantity ZEK. According to the first embodiment, quantity ZEK is a binary quantity. According to the second embodiment, quantity ZEK is a discrete quantity, which may assume several values within a range.

Block 107 is a controller, with which at least EBD braking can be performed. Normally this is a controller for carrying out braking slip control, where the EBD braking function is implemented. In order to perform EBD braking, signals or quantities Si1 are generated in controller 107 and sent to a block 108, which represents the actuator system assigned to the wheels. In the case of both a hydraulic brake system and an electrohydraulic brake system, actuator system 108 represents valves that are physically connected to the wheel brake cylinders of the respective wheels and which, when actuated, influence the braking pressure in the respective wheels.

Actuator system 108 generates signals or quantities Si2, which describe the status of the actuator system and are sent to block 107. Signals or quantities Si2 are used in determining the signals or quantities Si1 for carrying out EBD braking.

Depending on signals or quantities Si1, the actuator system is activated to perform EBD braking.

The present invention can also be used in a similar manner in a pneumatic, electropneumatic or electromechanical brake system.

Figure 2:
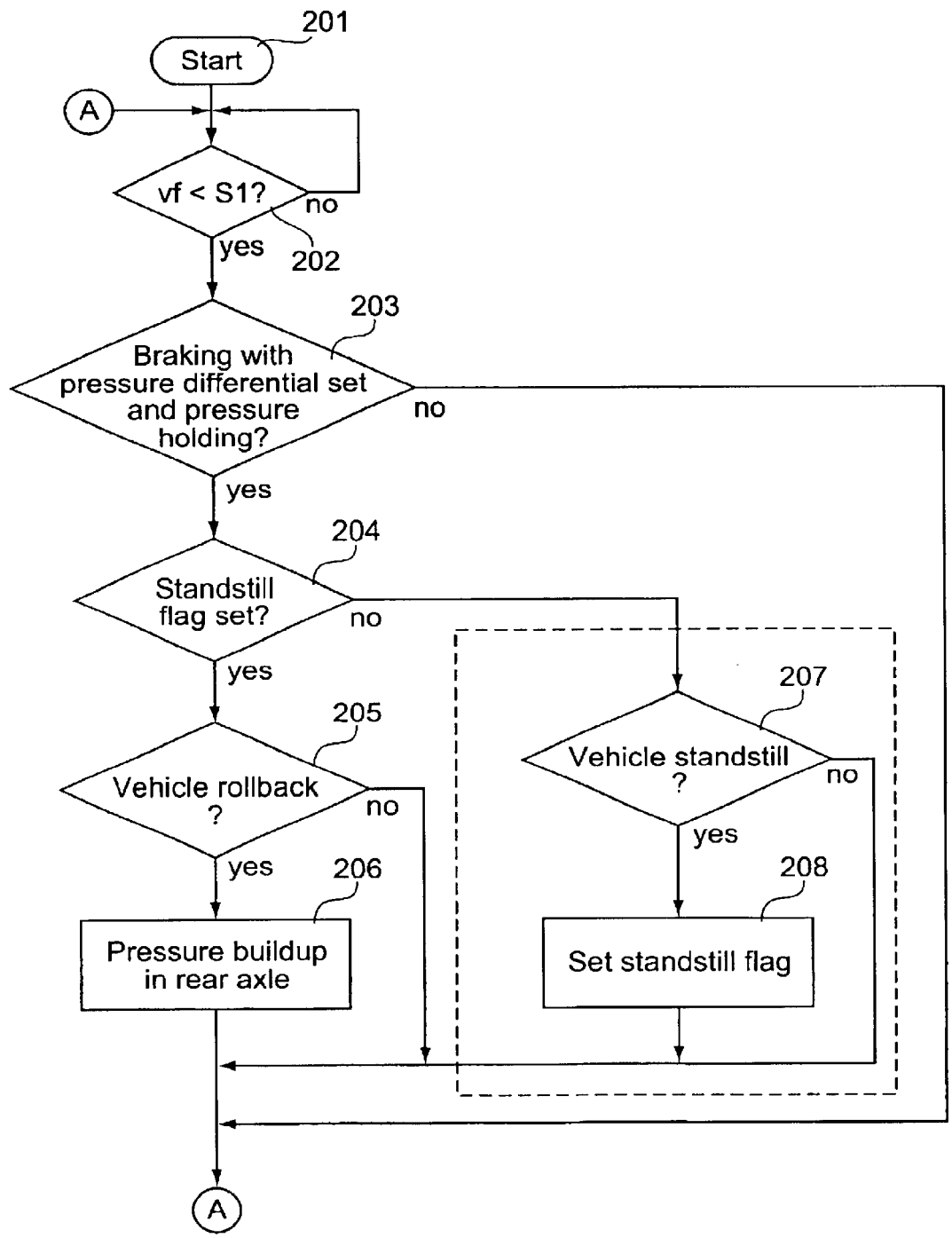
FIG. 2 shows a first embodiment of the method according to the present invention.

FIG. 2 shows a first exemplary embodiment of the method according to the present invention. The method according to the present invention starts with step 201, in which the standstill flag is initialized, among other things, i.e., quantity SEK is assigned the value 0. Value ZEK is assigned the value 0 in a similar manner. Step 201 is followed by step 202, in which it is checked whether velocity quantity vf is less than a threshold value S1. If it is established in step 202 that velocity quantity vf is greater than a threshold quantity S1, which is equivalent to an indication that due to the vehicle velocity it is not assumed at the next point in time that the vehicle is at a standstill, step 202 is executed again. At the same time, prior to performing step 202 again, both quantities SEK and ZEK are assigned the value 0. If, however, it is determined in step 202 that velocity quantity vf is less than threshold value S1, which is equivalent to saying that due to the vehicle velocity it is assumed at the next point in time that the vehicle is at a standstill, step 203 is executed following step 202.

Step 203 checks whether EBD braking, i.e., braking with a set pressure differential and pressure holding, exists. For this purpose, the signals or quantities present within controller 107 are checked. If step 203 determines that no EBD braking exists, step 202 is executed again following step 203. However, if step 203 determines that EBD braking exists, step 204 is executed following step 203.

Step 204 checks whether standstill flag SEK has been set. If step-204 establishes that the standstill flag is not set, standstill detection, composed of steps 207 and 208, is executed starting with step 207 following step 204. As shown in FIG. 1, a quantity or a signal Si3 that is sent from block 107 to block 105 is shown. This quantity or signal Si3 has the function of starting standstill detection in block 105 in the case where standstill flag SEK is not yet set.

Standstill detection, in which it is determined or checked whether the vehicle is at a standstill, takes place in step 207. For this purpose, in a first embodiment, as mentioned before, the velocity quantity vf, determined in block 102, is evaluated. According to the first embodiment, vehicle standstill exists if the velocity quantity vf is equal to or less than a first predefinable comparison value. In a second embodiment, as mentioned before, the velocity quantity vf determined in block 102 and the detection quantities RDFij determined in block 104 are evaluated. According to the second embodiment, vehicle standstill exists when the velocity quantity vf is equal to or less than a first predefinable comparison value, and when the detection quantities RDFhj of the rear wheels indicate that the signal does not alternate between the first and second signal values for either of the rear wheels, or when the velocity quantity vf is equal to or less than a first predefinable comparison value and when the detection values RDFvj of the front wheels indicate that the signal does not alternate between the first and second signal values for either of the front wheels, or when the velocity quantity vf is equal to or less than a first predefinable comparison value and when the detection values RDFvj of the front wheels indicate that the signal does not alternate between the first and second signal values for either of the front wheels and when at least the detection quantity RDFhj of one rear wheel indicates that the signal does not alternate between the first and second signal values.

If step 207 determines that no vehicle standstill exists, step 202 is executed again following step 207. If, however, step 207 determines that vehicle standstill exists, step 208 in which standstill flag SEK is set (SEK=1) is executed following step 207. Following step 208, step 202 is executed again.

However, if step 204 determines that standstill flag SEK has been set, no standstill detection is required; therefore, step 205 is executed following step 204.

In step 205 rollback recognition takes place, in which it is determined whether the vehicle is rolling back from a standstill. In a first embodiment wheel speed quantities vij, determined in block 103, are evaluated. According to the first embodiment, the vehicle is rolling back if the wheel speed quantities of the front wheels are equal to or less then a second predefinable comparison value and if the wheel speed quantity of at least one rear wheel is greater than the second comparison value. In a second embodiment, detection quantities RDFij, generated in block 104, are evaluated. According to the second embodiment, the vehicle is rolling back when the detection quantities of the front wheels RDFvj indicate that the signal does not alternate between the first and second signal values for either of the front wheels and when at least the detection quantity of one rear wheel RDFhj indicates that the signal alternates between the first and second signal values, or when the detection quantities of the front wheels RDFvj indicate that the signal does not alternate between the first and second signal values for either of the front wheels and when the detection quantities of the rear wheels RDFhj indicate that the signal alternates between the first and second signal value.

If step 205 determines that no vehicle rollback is occurring, step 202 is executed again following step 205. If, however, step 205 determines that vehicle rollback is occurring (ZEK=1), step 206 is executed following step 205. In step 206, pressure is built up in the rear axle with the braking pressure of at least one rear wheel being increased. Vehicle rollback is inhibited via this pressure buildup. At the same time, the two quantities SEK and ZEK are reset in step 206, i.e., they are assigned the value 0. Step 202 is executed again following step 206.

According to the first embodiment (and as shown in FIG. 1), quantity ZEK is a binary quantity. If vehicle rollback has been determined, quantity ZEK is assigned the value 1. If, however, no rollback has been determined, quantity ZEK is assigned the value 0.

Figure 3:
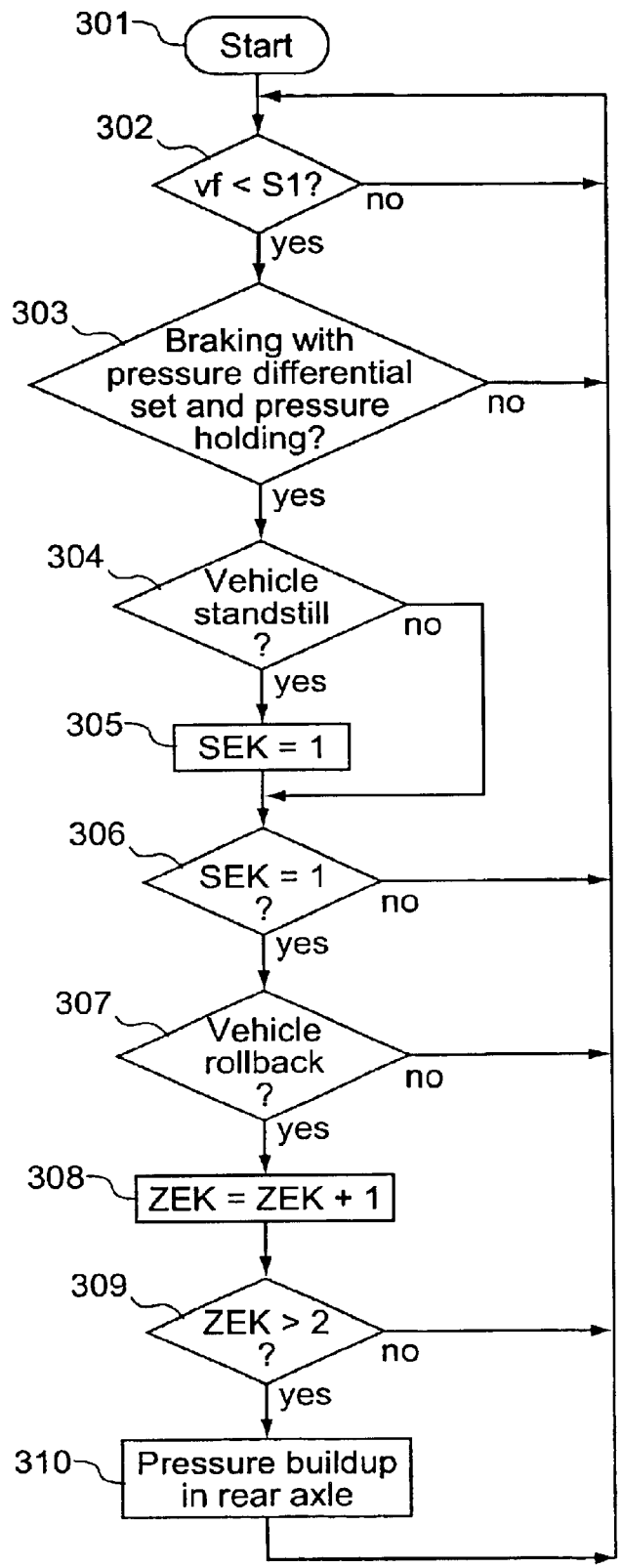
FIG. 3 shows a second embodiment of the method according to the present invention.

FIG. 3 illustrates a second embodiment of the method according to the present invention. The method begins with step 301, which corresponds to step 201 of FIG. 2. In other words, quantities SEK and ZEK are initialized in step 301. Following step 301, step 302, corresponding to step 202, is executed. If step 302 determines that velocity quantity vf is greater than a threshold value S, step 302 is executed again. At the same time, prior to executing step 302 again, the two quantities SEK and ZEK are assigned the value 0. However, if step 302 determines that velocity quantity vf is less than threshold value S1, step 303 is executed following step 302.

Step 303 corresponds to step 203. If step 303 determines that no EBD braking is occurring, step 302 is executed again following step 303. If, however, step 303 determines that EBD braking is occurring, step 304 is executed following step 303. Step 304 corresponds to step 207, i.e., the standstill recognition described in connection with step 207 takes place in step 304, where it is determined or checked whether the vehicle is at a standstill. If step 304 determines that the vehicle is not at a standstill, step 306 is executed following step 304. If, however, step 304 determines that the vehicle is at a standstill, following step 304, step 305 is executed in which standstill flag SEK is set, i.e., the value 1 is assigned to quantity SEK. Step 306, corresponding to step 204, is executed following step 305.

Step 306 checks whether standstill flag SEK has been set. If step 306 determines that the standstill flag has not been set (SEK=0), step 302 is executed again following step 306. If, however, step 306 determines that the standstill flag has been set (SEK=1), step 307 is executed following step 306. Rollback detection is performed in step 307, in which it is determined whether the vehicle is rolling back from standstill. Since step 307 corresponds to step 205, the rollback detection described in conjunction with step 205 is executed in step 307. If step 307 determines that no vehicle rollback is occurring, step 302 is executed again following step 307. If, however, step 307 determines that vehicle rollback is occurring, step 308 is executed following step 307.

In step 308, the quantity ZEK, which is a time quantity, i.e., it represents the first time counter, is incremented by one. As can be easily seen, the value of quantity ZEK is incremented by 1 whenever step 307 detects vehicle rollback. In other words, the longer rollback lasts, the greater the value of quantity ZEK, i.e., of the time counter. Step 309 is executed following step 308. In step 309 the value of quantity ZEK is compared with a threshold value S2, i.e., it is checked whether the rollback condition has been present for a predefined period of time, i.e., whether it has lasted for a predefined period of time. If step 309 determines that the value of quantity ZEK is less than threshold value S2, which is to say that vehicle rollback probably occurred due a pitching motion of the vehicle or that vehicle rollback has not yet been occurring for too long, step 302 is executed again following step 309, since in this case no pressure buildup in the rear axle is required. If, however, step 309 determines that the value of quantity ZEK is greater than threshold value S2, which is to say that considerable vehicle rollback has occurred, which requires pressure buildup in the rear axle, then step 310 is executed following step 309.

With respect to FIG. 1, in the second embodiment, the value of quantity ZEK is sent from block 106 to block 107.

In step 310, which corresponds to step 206, pressure is built up in the rear axle, increasing the braking pressure at least on one rear wheel. Vehicle rollback is inhibited via this pressure buildup. At the same time, the two values SEK and ZEK are reset in step 310, i.e., they are assigned a value 0. Step 302 is executed again following step 310.

With an assumption that threshold value S1 is greater than the first or second predefinable comparison value and also greater than the vehicle velocity at the time when the detection quantities are evaluated, this ensures that vehicle rollback is detected at least until both quantities SEK and ZEK are reset on the basis of step 202 or 302.

The device according to the present invention has standstill recognition (block 105) and rollback recognition (block 106) as preferable components. According to the second embodiment, at least rollback detection responds at wheel speeds that are less than the lowest detectable wheel speeds. In the case of a vehicle with a heavy rear load, the rear axle, which is possibly underbraked with EBD braking, receives more braking pressure according to the present invention due to rollback recognition in a vehicle at a standstill on an incline, so that further vehicle rollback with locked front wheels is no longer possible.

Furthermore, it should be noted that the form of the embodiments described above and shown in the drawings have no limiting effect on the inventive concept of the present invention.

What is claimed is:

1. A device for preventing a rollback of a vehicle on an incline, the vehicle including a brake system, at least one front wheel and at least one rear wheel, the brake system being utilized for influencing a first braking pressure in a first wheel brake of the at least one rear wheel to distribute a braking action between the at least one front wheel and the at least one rear wheel, the braking action being distributed by actuating actuators assigned to the at least one rear wheel so that a differential is set between a second braking pressure in a second wheel brake of the at least one front wheel and the first braking pressure in the first wheel brake of the at least one rear wheel, the device comprising:

a first arrangement determining whether the vehicle is at a standstill due to the braking action in which the differential between the first braking pressure and the second braking pressure has been set;

a second arrangement determining whether the vehicle is rolling back from the standstill, and increasing the first braking pressure in the first wheel brake of the at least one rear wheel to inhibit the rollback of the vehicle if the rollback is detected;

a sensor arrangement generating at least one wheel rotational speed signal which is associated with a rotation of the at least one front wheel and the at least one rear wheel, the sensor arrangement being assigned to the front and rear wheels;

a third arrangement determining a velocity quantity as a function of the at least one wheel rotational speed signal, the velocity quantity being indicative of a velocity of the vehicle, the first arrangement evaluating the velocity quantity for detecting the standstill; and a fourth arrangement detecting at least one wheel speed quantity as a function of the at least one wheel rotational speed signal, the at least one wheel speed quantity being indicative of wheel speeds of individual wheels of the front and rear wheels, the second arrangement evaluating the at least one wheel speed quantity for detecting the rollback;

wherein the rollback occurs when the at least one wheel speed quantity of the at least one front wheel is equal to or less than a second predefinable comparison value, and the at least one wheel speed quantity of the at least one rear wheel is greater than the second predefinable comparison value.

2. A device for preventing a rollback of a vehicle on an incline, the vehicle including a brake system, at least one front wheel and at least one rear wheel, the brake system being utilized for influencing a first braking pressure in a first wheel brake of the at least one rear wheel to distribute a braking action between the at least one front wheel and the at least one rear wheel, the braking action being distributed by actuating actuators assigned to the at least one rear wheel so that a differential is set between a second braking pressure in a second wheel brake of the at least one front wheel and the first braking pressure in the first wheel brake of the at least one rear wheel, the device comprising:

a first arrangement determining whether the vehicle is at a standstill due to the braking action in which the differential between the first braking pressure and the second braking pressure has been set;

a second arrangement determining whether the vehicle is rolling back from the standstill, and increasing the first braking pressure in the first wheel brake of the at least one rear wheel to inhibit the rollback of the vehicle if the rollback is detected;

a sensor arrangement generating at least one wheel rotational speed signal which is associated with a rotation of the at least one front wheel and the at least one rear wheel, the sensor arrangement being assigned to the front and rear wheels;

a third arrangement determining a velocity quantity as a function of the at least one wheel rotational speed signal, the velocity quantity being indicative of a velocity of the vehicle, the first arrangement evaluating the velocity quantity for detecting the standstill; and a fourth arrangement determining at least one detection quantity for the individual wheels as a function of the at least one wheel rotational speed signal, wherein the at least one wheel rotational speed signal alternates between a first signal value and a second signal value as a function of rotation characteristics of a respective wheel of the front and rear wheels, the at least one detection quantity being indicative of an alternation of the at least one wheel rotational speed signal between the first signal value and the second signal value, wherein the at least one detection quantity is evaluated in at least one of:

the first arrangement to detect the standstill, and
the second arrangement to detect the rollback;

wherein at least one of:

the standstill occurs if the velocity quantity is equal to or less than a first predefinable comparison value, and if the at least one detection quantity of the front wheels indicates that no alternation between the first signal value and the second signal value is occurring, and the rollback occurs when the at least one detection quantity of the at least one front wheel indicates that no alternation between the first signal value and the second signal value is occurring for the at least one front wheel, and when the at least one detection quantity of one of the at least one rear wheel indicates that the alternation is occurring between the first signal value and the second signal value.

3. A device for preventing a rollback of a vehicle on an incline, the vehicle including a brake system, at least one front wheel and at least one rear wheel, the brake system being utilized for influencing a first braking pressure in a first wheel brake of the at least one rear wheel to distribute a braking action between the at least one front wheel and the at least one rear wheel, the braking action being distributed by actuating actuators assigned to the at least one rear wheel so that a differential is set between a second braking pressure in a second wheel brake of the at least one front wheel and the first braking pressure in the first wheel brake of the at least one rear wheel, the device comprising:

a first arrangement determining whether the vehicle is at a standstill due to the braking action in which the differential between the first braking pressure and the second braking pressure has been set;

a second arrangement determining whether the vehicle is rolling back from the standstill, and increasing the first braking pressure in the first wheel brake of the at least one rear wheel to inhibit the rollback of the vehicle if the rollback is detected;

a sensor arrangement generating at least one wheel rotational speed signal which is associated with a rotation of the at least one front wheel and the at least one rear wheel, the sensor arrangement being assigned to the front and rear wheels;

a third arrangement determining a velocity quantity as a function of the at least one wheel rotational speed signal, the velocity quantity being indicative of a velocity of the vehicle, the first arrangement evaluating the velocity quantity for detecting the standstill; and a fourth arrangement determining at least one detection quantity for the individual wheels as a function of the at least one wheel rotational speed signal, wherein the at least one wheel rotational speed signal alternates between a first signal value and a second signal value as a function of rotation characteristics of a respective wheel of the front and rear wheels, the at least one detection quantity being indicative of an alternation of the at least one wheel rotational speed signal between the first signal value and the second signal value, wherein the at least one detection quantity is evaluated in at least one of:

the first arrangement to detect the standstill, and
the second arrangement to detect the rollback;

wherein the rollback occurs:

when the at least one detection quantity of the at least one front wheel indicates that no alternation between the first signal value and the second signal value is occurring for the at least one front wheel, and when the at least one detection quantity of the at least one rear wheel indicates that the alternation is occurring between the first signal value and the second signal value for two of the at least one rear wheel.

* * * * *

UNITED STATES PATENT AND TRADEMARK OFFICE
CERTIFICATE OF CORRECTION

PATENT NO. : 6,814,414 B1
DATED : November 9, 2004
INVENTOR(S) : Johannes Schmitt et al.

It is certified that error appears in the above-identified patent and that said Letters Patent is hereby corrected as shown below:

<u>Column 1,</u>
Lines 35-36, change "German Patent Other "hill holder" systems" to
-- German Patent Application No. 43 32 459.
      Other "hill holder" systems --

Signed and Sealed this

Second Day of August, 2005

JON W. DUDAS
*Director of the United States Patent and Trademark Office*